United States Patent
Jogi et al.

(10) Patent No.: US 7,548,521 B2
(45) Date of Patent: Jun. 16, 2009

(54) SYSTEM FOR DYNAMICALLY SHIFTING BEACONS IN DISTRIBUTED WIRELESS NETWORK AND METHOD THEREOF

(75) Inventors: Sunil Dilipkumar Jogi, Bangalore (IN); Prashant Wason, Bangalore (IN); Manoj Choudhary, Bangalore (IN); Balaji Srinivas Holur, Bangalore (IN); Thenmozhi Arunan, Bangalore (IN); Yong-suk Kim, Deajeon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 571 days.

(21) Appl. No.: 11/185,795

(22) Filed: Jul. 21, 2005

(65) Prior Publication Data
US 2006/0018298 A1    Jan. 26, 2006

(30) Foreign Application Priority Data
Jul. 21, 2004   (IN)   .................................. 716/04
Dec. 24, 2004  (KR)  ..................... 10-2004-0112265

(51) Int. Cl.
H04W 4/00       (2009.01)
(52) U.S. Cl. .................. 370/328; 370/320; 370/338; 370/350; 370/235; 370/312; 370/348; 455/11.1; 455/454; 455/452.1; 455/450; 455/509
(58) Field of Classification Search ................ 370/320, 370/338, 350, 235, 312, 348; 455/11.1, 454, 455/452.1, 450, 509
See application file for complete search history.

(56) References Cited

U.S. PATENT DOCUMENTS

| | | | | |
|---|---|---|---|---|
| 5,260,944 A | * | 11/1993 | Tomabechi | 370/347 |
| 6,141,336 A | * | 10/2000 | Bauchot et al. | 370/348 |
| 6,504,853 B1 | * | 1/2003 | Lindgren et al. | 370/468 |
| 6,678,252 B1 | * | 1/2004 | Cansever | 370/253 |
| 6,795,418 B2 | * | 9/2004 | Choi | 370/336 |
| 6,885,868 B1 | * | 4/2005 | Naim et al. | 455/452.1 |
| 2002/0071413 A1 | * | 6/2002 | Choi | 370/337 |
| 2004/0028018 A1 | * | 2/2004 | Cain | 370/338 |
| 2004/0032847 A1 | * | 2/2004 | Cain | 370/338 |
| 2004/0114563 A1 | * | 6/2004 | Shvodian | 370/347 |
| 2005/0213503 A1 | * | 9/2005 | Guo et al. | 370/230 |
| 2005/0249173 A1 | * | 11/2005 | Salokannel et al. | 370/338 |
| 2006/0198353 A1 | * | 9/2006 | Wason et al. | 370/347 |

* cited by examiner

Primary Examiner—Charles N Appiah
Assistant Examiner—Kwasi Karikari
(74) Attorney, Agent, or Firm—Sughrue Mion, PLLC

(57) ABSTRACT

A system for dynamically shifting beacons in a distributed wireless network and a method thereof are disclosed. In a medium access control for a wireless personal area network based on a mobile ad-hoc network, beacons are shifted to other free lower slots in order to reduce the size of a beacon period. Also, collisions that may occur during the shifting of the beacons are detected and avoided. According to the system and method, the size of the beacon period for transmitting data can sufficiently be secured by dynamically reducing the size of the beacon period without collisions.

20 Claims, 4 Drawing Sheets

(a) BP

| 0 | 1 | 2 | 3 | 4 | 5 | 6 | 7 | | | | | |
|---|---|---|---|---|---|---|---|---|---|---|---|---|
| C |   | B |   |   | A |   |   |   |   |   |   | ... |

(a-1) BPOIE

| C | 0 | B | 2 |
|---|---|---|---|

(a-2) BPOIE

| C | 0 | A | 1 | B | 2 |
|---|---|---|---|---|---|

(b) BP

| 0 | 1 | 2 | 3 | 4 | 5 | 6 | 7 | | | | | |
|---|---|---|---|---|---|---|---|---|---|---|---|---|
| C |   |   |   |   | A | D |   |   |   |   |   | ... |

(b-1) BPOIE

| A | 5 | D | 6 |
|---|---|---|---|

(b-2) BPOIE

| A | 1 | A | 5 | D | 6 |
|---|---|---|---|---|---|

SYSTEM FOR DYNAMICALLY SHIFTING BEACONS IN DISTRIBUTED WIRELESS NETWORK AND METHOD THEREOF

This application claims benefit under 35 U.S.C. § 119 from Indian Patent Application No. 716/CHE/2004 filed Jul. 21, 2004 and Korean Patent Application No. 2004-112265 filed Dec. 24, 2004, which are incorporated herein by reference in their entirety.

BACKGROUND OF THE INVENTION

1. Field of the Invention

The present invention relates to a system for dynamically shifting beacons in a distributed wireless network and a method thereof, and more particularly to a system for dynamically shifting beacons in a distributed wireless network and a method thereof that enable respective devices in the network to effectively send their beacons in a medium access control for the wireless personal area network based on a wireless mobile ad-hoc network.

2. Description of the Related Art

A WPAN (Wireless Personal Area Network) is defined as a network that operates in a personal area of about 10 meters. IEEE (Institute of Electrical and Electronics Engineers) is involved in defining standards for such wireless personal area networks. The UWB (Ultra Wide Band) communication technology can provide transmission rates of more than several hundred Mbps in such a personal area. In a WPAN, mediums are shared among all devices for mutual communications. This requires a medium access control method for controlling the medium access of the devices, which includes, in a broad sense, how to access the network, how to transmit data to other devices at a desired transmission rate, how to optimally use the medium, how to detect and dissolve collision of beacons, etc.

The medium access control method for a WPAN may be classified into a centralized access method and a distributed access method. According to the centralized access method, a device operates for the whole network in order to manage and control the medium access for all devices. All other devices request the help of a centralized coordinator for their medium access functions such as network joining and channel time allocation.

According to the distributed access method, the medium access operations are evenly distributed over all devices in the network, and all devices share the burden of management of their mutual medium access. Although the IEEE standard refers to the centralized medium access control method, several distributed medium access control methods have been discussed for the WPAN because such methods provide flexibility in terms of mobility to the devices.

FIG. 1 is a view illustrating a WPAN according to the conventional distributed access method.

Referring to FIG. 1, the WPAN includes many devices that are indicated as points. Circles drawn around the respective device indicate transmission and reception ranges of the device, in which beacons of the device are received. Any device in the network is not acting as a dedicated coordinator.

The WPAN based on the distributed access method does not have any centralized coordinator. In the network, a separate dedicated coordinator is not present, but each device serves as light coordinators and they cooperate with one other. Also, devices share information required for performing the medium access control functions such as a channel time allocation, synchronization, power saving, etc., for the data transmission to other devices. This network system is called an ad-hoc distributed wireless personal area network. Each device periodically broadcasts information about their neighbor devices and information about channel times allocated to the neighbor devices.

The distributed medium access control method depends on a timing concept called 'superframe'. This superframe has a fixed length in time, and is divided into a plurality of time windows that are called 'time slots'. Some time slots are used for the devices to send beacons, and the remaining slots are used to send data. The slots that send the beacons are called 'beacon slots', and the slots that send the data are called 'data slots'.

The length of a BP (Beacon Period) that is composed of beacon slots may be shorter than the length of a data period. The beacon slots may be distributed through the superframe, or may appear together at the start part of the superframe. In addition, the index of beacon slots may be fixed, or may be variable leading to different configurations to the distributed medium access control method.

FIG. 2 is a view illustrating an example of a conventional superframe structure.

The superframe structure as illustrated in FIG. 2 is based on what is defined by the Multiband OFDM (Orthogonal Frequency Division Multiplexing) Alliance draft version 0.5. This includes several time slots, also called MASs (Medium Access Slots), e.g., a and c in FIG. 2. Some MASs (a in FIG. 2) make a beacon period (b in FIG. 2). Each MAS in beacon period is divided in to 3 beacon slots. The remaining MASs (c in FIG. 2) make a data period (d in FIG. 2). These MASs can be used by a device in the network in order to transfer the data to other devices in the network. Each superframe is 65,536 μs, and each MAS is 256 μs. The length of the beacon period can be variable.

The variable length beacon period means that the length of the beacon period is increased as the number of beaconing devices becomes larger around the device while the length of the beacon period is reduced as the number of beaconing devices becomes fewer around the device. If there is almost no device subject to communication, the variable length of the beacon period makes it possible to greatly secure the data period d for data communication, and is useful in reducing the power consumption.

Information about the superframe is broadcasted through beacons by the devices. Accordingly, neighboring devices of a device can use the information for the next process. The start time of the superframe is determined by the start of the beacon period, and is defined as a BPST (Beacon Period Start Time).

The devices can use the same BPST for the superframe. The medium access slots are numbered in relation to this start time. All devices would receive the beacons during BP of the superframe to obtain the time synchronization.

In the beacons broadcasted by the devices, BPOIE (Beacon Period Occupancy Information Element) is always included. The BPOIE includes beacon information of neighboring devices received in the beacon period b by the device. Upon reception of a beacon, the device stores the sender's DEVID (Device Identifier) with the beacon slot index in which the beacon was received. Then, in the next superframe, the device includes the stored information in the BPOIE of the beacon being broadcast by it. The information of the beacons received during a superframe is included in the BPOIE to be sent in the next superframe. Here, it should be noted that the BPOIE refers to a method for indicating a device's occupancy of the beacon slots in a two-hop area, and is independent of the beaconing procedure.

If the DEVID of a certain device does not show up in the BPOIE of a neighboring device beacon for specified successive number of superframes, this means that the corresponding device will change the corresponding beacon slot to an idle slot in the next superframe.

According to the conventional method, however, there is no way to dynamically reduce the size of the beacon period and, thus, to use a still larger part of the superframe for the data transmission or power saving is not possible.

In an environment in which many devices are used, the beacon slots of a large beacon period that has been used by the devices may become free as the devices leave or power-off. These free slots may be available in middle of the beacon period. However, even if the free slots are located on the middle of the beacon period, the size of the beacon period is kept as it is, and thus the use of the channel time of the superframe becomes inefficient.

Further, because of a large beacon period having a small number of beacons, the devices has to be awake for long time, and this conflicts with the necessity of power saving.

SUMMARY OF THE INVENTION

The present invention has been developed in order to solve the above drawbacks and other problems associated with the conventional arrangement.

An aspect of the present invention is to provide a system for dynamically shifting beacons in a distributed wireless network and a method thereof that can reduce the size of a beacon period and secure a large data period by shifting the beacons to other lower beacon slots in a UWB (Ultra Wide Band) wireless personal area network based on a mobile ad-hoc network of a non-centralized network topology.

The foregoing and other aspects are substantially realized by providing a method for dynamically shifting beacons in a distributed wireless network based on a mobile ad-hoc network, according to the present invention, comprising selecting a slot among free lower slots which are anterior beacon slots that are not used during a beacon period of a superframe, requesting a protection of the selected free lower slot in a beacon group, and a device receiving a response to the protection request and shifting the beacons to the selected free lower slot to broadcast the beacons.

In an exemplary embodiment, the network is a UWB (Ultra Wide Band) wireless personal area network.

In another exemplary embodiment, the response is made by neighboring devices in the beacon group that receive the protection request.

In yet another exemplary embodiment, the operation of selecting the slot includes the steps of receiving the beacons of the neighboring devices and receiving beacon period occupancy information element included in the beacons, and confirming an occupancy state of the beacon period by the neighboring devices BPOIE and selecting the free lower slot.

In yet another exemplary embodiment, the beacon period occupancy information element is an occupancy information element of the information about beacon period provided by the neighboring device in its beacon, and includes a slot index in which the device is presently beaconing In yet another exemplary embodiment, the free lower slot is selected among the free lower slots.

In yet another exemplary embodiment, the protection request is made by broadcasting the beacon period occupancy information element that further includes information of the device itself and the index of the selected free lower slot to the neighboring devices through the beacons.

In yet another exemplary embodiment, the response includes the beacon period occupancy information element including information of the device itself, the index of the present beacon slot and the index of the selected free lower slot.

In yet another exemplary embodiment, if the neighboring device receives another protection request for the same slot as the selected free lower slot from another device, the response is made against the protection request of the device having a higher slot index that the device is presently beaconing.

In yet another exemplary embodiment, the response is made through the beacon period occupancy information element that includes information about the device that has made the protection request to which the response is to be made, the index of the selected free lower slot, and the index of the present beacon slot corresponding to the device that has made the protection request to which the response is to be made.

In yet another exemplary embodiment, if the neighboring device receives a protection request for the same slot as the selected free lower slot from another device, the response is made denying the protection request of either the device having a highest DEVID or the device having a lowest DEVID among a series of DEVIDs of the devices that have made the protection requests.

In yet another exemplary embodiment, the device shifts the beacons to the selected free lower slots only in the case that the response is received from all the neighboring devices that have received the protection request.

According to another aspect of the present invention, there is provided a system for dynamically shifting beacons in a distributed wireless network based on a mobile ad-hoc network having at least one device, according to the present invention, comprising a requesting device for selecting a slot among free lower slots which are anterior beacon slots that are not used in beacon period of the superframe, requesting a protection of the selected free lower slot in its beacon group, and shifting the beacons to the selected free lower slot to broadcast the beacons, and at least one responding device for responding to the protection request of the device.

In an exemplary embodiment, the network is a UWB (Ultra Wide Band) wireless personal area network.

In another exemplary embodiment, the requesting device selects the free lower slot by receiving the beacons of the neighboring devices, receiving beacon period occupancy information elements included in the beacons, and understanding an occupancy state of the beacon period slots by the neighboring devices.

In yet another exemplary embodiment, the beacon period occupancy information element is an occupancy information element of the beacon period provided by the neighboring device that broadcasts the beacon.

In yet another exemplary embodiment, the requesting device, in selecting the free lower slot, selects the most anterior slot among the free lower slots in the beacon period.

In yet another exemplary embodiment, the protection request is made by the requesting device's broadcasting of the beacon period occupancy information element that further includes information of the requesting device itself and the index of the selected free lower slot to the at least one responding device through the beacons.

In yet another exemplary embodiment the response is made through the beacon period occupancy information element that includes information of the requesting device, the index of the selected free lower slot, and the index of the present beacon slot.

In yet another exemplary embodiment, if the responding device receives another protection request for the same slot as the selected free lower slot from another device except for the requesting device, the response is made against the protection request of the device having a higher slot index that the device is presently beaconing.

Also, in yet another exemplary embodiment, the response is made through the beacon period occupancy information element that includes information about the device that has made the protection request to which the response is to be made, the index of the selected free lower slot, and the index of the present beacon slot corresponding to the device that has made the protection request to which the response is to be made.

In yet another exemplary embodiment, if the neighboring device receives a protection request for the same slot as the selected free lower slot from another device except for the requesting device, the response is made against the protection request of either the device having a highest DEVID or the device having a lowest DEVID among a series of DEVIDs of the devices that have made the protection requests.

In yet another exemplary embodiment, the requesting device shifts the beacons to the selected free lower slots only in the case that the response is received from all the responding devices that have received the protection request.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Figure 1:
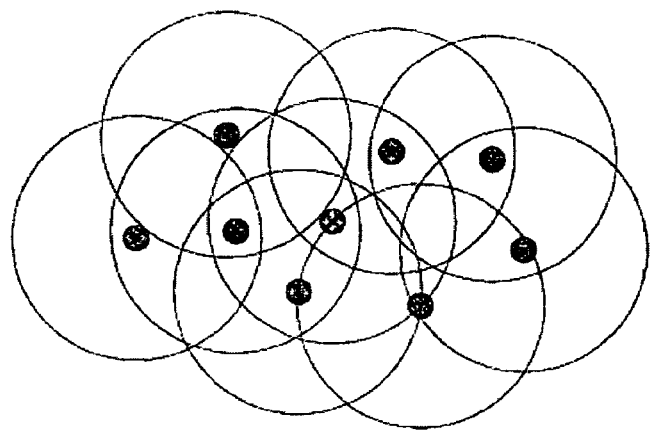
FIG. 1 is a view illustrating a WPAN according to a conventional distributed access method.
Figure 2:
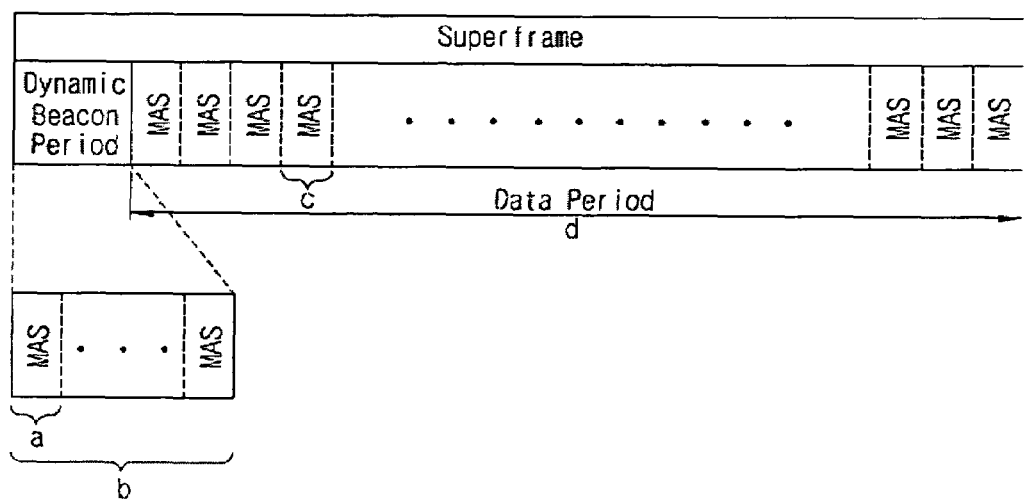
FIG. 2 is a view illustrating an example of a conventional superframe structure.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figures 3, 4:
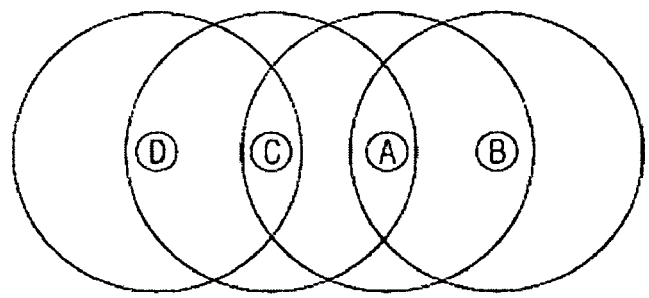
FIG. 3 is a view illustrating a network that includes a device for dynamically shifting beacons in a distributed wireless network according to an exemplary embodiment of the present invention.
FIG. 4 is a view explaining beacon period occupancy information elements according to an exemplary embodiment of the present invention.

FIG. 3 is a view illustrating a network that includes a system for dynamically shifting beacons in a distributed wireless network according to an exemplary embodiment of the present invention.

The wireless network of FIG. 3 is a non-centralized WPAN (Wireless Personal Area Network) that is based on a mobile ad-hoc network and that does not have any centralized coordinator.

In an exemplary embodiment the network is a UWB (Ultra Wide Band) wireless personal area network.

Referring to FIG. 3, the network includes a device A, device B, device C and device D. Circles drawn around the respective devices indicate transmission and reception ranges in which beacons of the respective devices are received.

The device A is a 'requesting device' that intends to shift beacons according to the beacon shifting method of the present invention. The devices B and C are 'responding devices' that are neighboring devices of the device A and belong to a beacon group that can receive the beacon of the device A. The device D's beacon group includes the device C. The device D cannot receive the beacon of the device A unlike the device C.

The device D can shift the beacons in the same manner as the device A. Hereinafter, for the convenience in explanation, the beacon shifting of the device A will be explained.

According to an exemplary embodiment of the present invention, the device A performs a new beacon shifting procedure, which includes a method for protecting the beacon slot to which the device A wants to shift the beacon, a method for detecting collision that may occur in the beacon slot newly selected for the shifting of the beacon, and the use of an improved BPOIE (Beacon Period Occupancy Information Element).

The shifting of the beacon is to reduce the size of the BP (Beacon Period) and thus to secure a larger data period required for the data transmission. It is possible for the device A to shift the beacon to a slot that is not in use without any collision caused by the shifting. This can be achieved by protecting the slot to which the device A intends to shift the beacon.

In an exemplary embodiment, the beacon is shifted to a free lower slot having a time-preceding position among the beacon slots that are not in use. Accordingly, the slot index of the free lower slot is low.

Hereinafter the BPOIE will be explained.

FIG. 4 is a view explaining beacon period occupancy information elements according to an exemplary embodiment of the present invention.

In FIG. 4, '(a)' represents the beacon period of the superframe in the beacon group of the device A, and '(a-1)' and '(a-2)' represent the BPOIEs broadcast by the device A.

Referring to FIG. 3 and '(a)' of FIG. 4, the device C occupies the slot index '0' of the beacon period in the beacon group centering around the device A, the device B occupies the slot index '2', and the device A occupies the slot index '5'. In this case, the device A intends to shift to the free lower slot index '1' among the free lower slot indices 1, 3 and 4.

The BPOIE has the form of the beacon slot index that the device is beaconing and the DEVID (Device Identifier) of the corresponding device, and includes information about the occupancy state of the beacon slots in the beacon period.

Generally, the BPOIE includes beacon slot occupancy information of the neighboring devices of the device that is sending the beacon. Accordingly, if the device A does not shift the beacons, the BPOIE sent by the device is as shown at '(a-1)' in FIG. 4. That is, it includes the DEVID (here, 'C') of the device C and the slot index '0', and the DEVID of the device B and the slot index '2'.

However, the device that intends to shift the beacons includes information about the shifting of the beacons by using the improved BPOIE. The BPOIE includes the DEVID of the device A that intends to shift the beacons and the slot index selected for the shifting. Accordingly, if the device A intends to shift the beacon to the slot index 'I', the BPOIE being sent by the device A includes the DEVID (here, 'A') of the device A and the slot index '1' to which the device A intends to shift.

The improved BPOIE has an entry for the device A that is sending the special BPOIE. The BPOIE is the protection request of the device A to all neighboring devices.

The neighboring devices B and C that have received the beacon can discriminate the improved BPOIE from the general BPOIE. This is because the improved BPOIE includes the DEVID of the sending device A. As described above, the improved BPOIE is considered as the protection request of the device that intends to protect the corresponding beacon slot.

The BPOIE being broadcast by the neighboring devices in the next superframe includes twice the DEVID of the device A that intends to shift the beacon. The first DEVID of the device A is for the slot index that the device A is presently beaconing, and the second DEVID of the device A is for the slot index that the device A intends to shift the beacon according to the protection request.

In FIG. 4, '(b)' represents the beacon period of the superframe in the beacon group of the device C. If the device A does not want to shift the beacon, the device C will send the general BPOIE (b-1). However, if the device A wants to shift the beacon and the device C receives the improved BPOIE from the device A, the device C sends the improved BPOIE (b-2). Accordingly, the DEVID of the device A is included twice. The BPOIE broadcasted by the device C is received by the device D, and the device D can recognize that the device A has occupied the slot index '1' for the shifting of the beacon.

Figure 5:
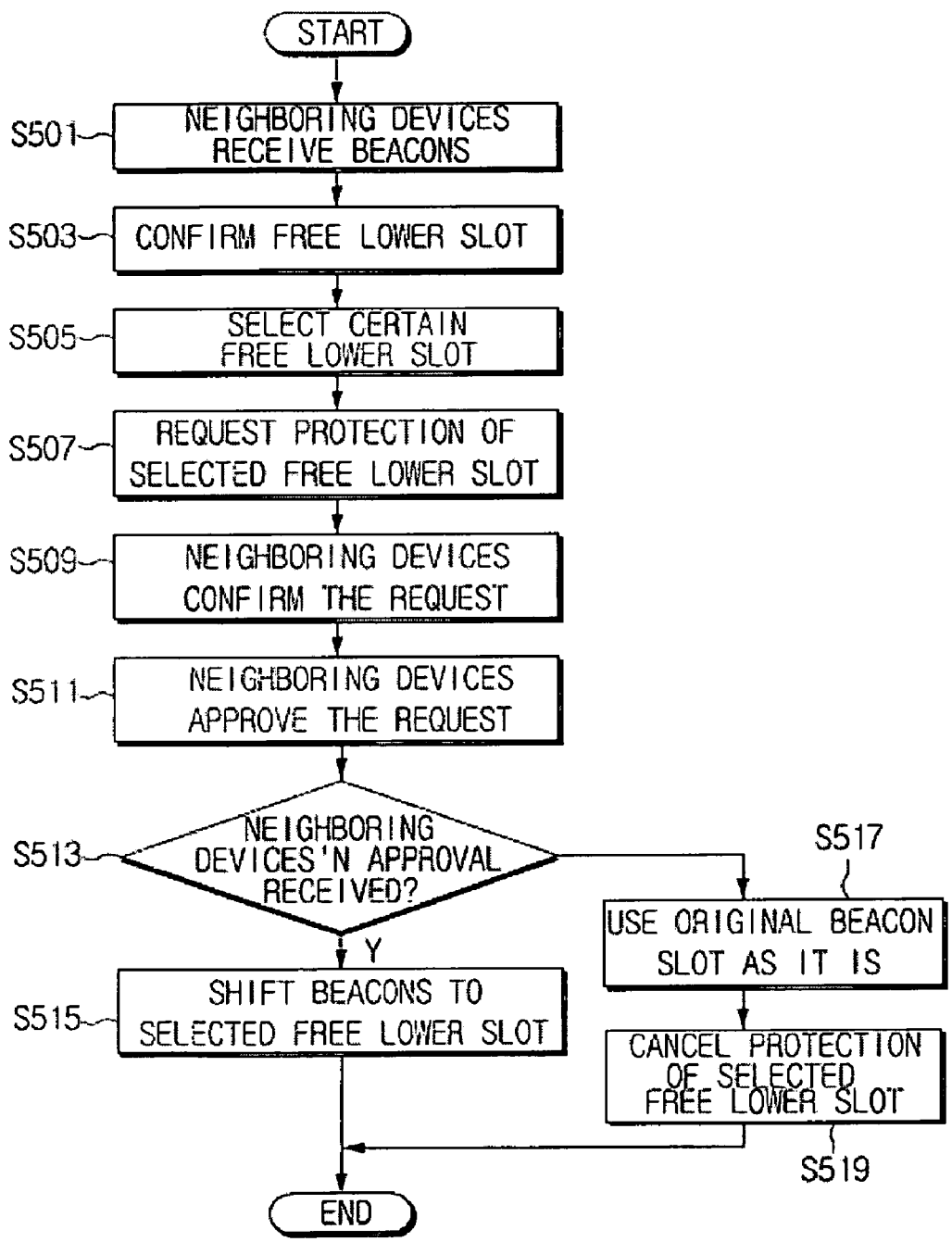
FIG. 5 is a flowchart provided for explaining a method for shifting beacons performed by a system for dynamically shifting beacons in a distributed wireless network according to an exemplary embodiment of the present invention.

FIG. 5 is a flowchart provided for explaining the method for shifting beacons performed by the system for dynamically shifting beacons in a distributed wireless network according to an exemplary embodiment of the present invention. Hereinafter, the beacon shifting method performed by the device according to an exemplary embodiment of the present invention will be explained with reference to FIGS. 3 to 5.

The device A, in order to protect the beacon slot index '1' selected for the shifting of the beacon, provides additional information of the selected beacon slot index '1' through a BPOIE (a-2). As the device A protects the selected slot, the selected slot is protected by the neighboring devices B and C of the device A.

Further, the slot should be protected from devices that do not belong to the beacon group of the device A but belong to the beacon group of the neighboring devices B and C. Such a device may be called a 'neighbor of a 'two-hop area', and the device D corresponds to this device.

The device A receives the beacons from the neighboring devices in the beacon period (step S501). Then, the device A judges whether there is any usable free lower slot in the beacon period by understanding the occupancy information of the neighboring devices through their BPOIEs (step S503). At that time, the device A selects one free lower slot among the usable free lower slots for the shifting of the beacon. The device A can shift the beacon to any free lower slot. As shown as '(a)' in FIG. 4, the device A selects to shift the beacon to the free lower slot index '1' among the usable free lower slot indices 1, 3 and 4 (step S505).

Before shifting the beacon to the free lower slot selected at step S505, the device A requests the protection of the selected slot by announcing the selected free lower slots through the BPOIE (a-1) that includes additional information about the slot index of the selected free lower slot and the DEVID of the device itself (step S507).

If the neighboring devices B and C receive the improved BPOIE having information about the DEVID of the device A and the free lower slot from the device A, they judge that the device A has requested the protection of the selected free lower slot.

If the protection request is recognized, the neighboring devices B and C of the device A should protect the selected slot, and make it possible to protect the slot from the neighboring slots in the two-hop area.

The neighboring devices B and C may receive the protection request for some slots from two or more devices. In this case, the neighboring devices can protect the corresponding slot only for one of such devices (step S509).

If a certain device receives a protection request for a free slot from the device A that intends to shift the beacon, the device responds to the device A by adding an entry of the selected slot index and the received DEVID to the BPOIE of the device itself (step S511).

In the next superframe for which the improved BPOIE is broadcast, the device A checks whether responses are received from all the neighboring devices. That is, the device A judges whether there is an entry having the beacon slot index selected by the device itself for shifting and its own DEVID in the BPOIEs of the beacons received from the neighboring devices B and C during the next superframe (step S513).

If the device A that intends to shift the beacons receives the entry of the protection-requested slot in the BPOIEs of all the neighboring devices B and C as expected at step S513, the device A decides that the beacon shifting to the selected slot is approved. The device A then can broadcast its own beacon through the selected new beacon slot in the next superframe. In this case, the original slot will be considered as the free slot (step S515).

Meanwhile, if the device A that intends to shift the beacons does not receive the entry of the protected slot in the BPOIEs of all the neighboring devices B or C at step S513, the device A will not shift to the protected slot, but will continue the beaconing in the original slot. This situation may occur when the other device such as the device D uses or intends to use the corresponding selected slot (step S517).

Further, the device A removes the protection of the corresponding slot to which the device A intends to shift the beacon. The next BPOIE to be transmitted by the device A does not include the DEVID for the same free lower slot and the device continues to send a beacon in its original slot. However, the device A can select the free lower slot and re-perform the procedure (step S519).

For the shifting of the beacon slot, the present invention provides the following method for detecting a collision expected in the selected slot.

If two or more devices select the same free lower slot for their own beacon shifting, the responding device can detect the possible collision by looking to the BPOIEs.

Figure 6:
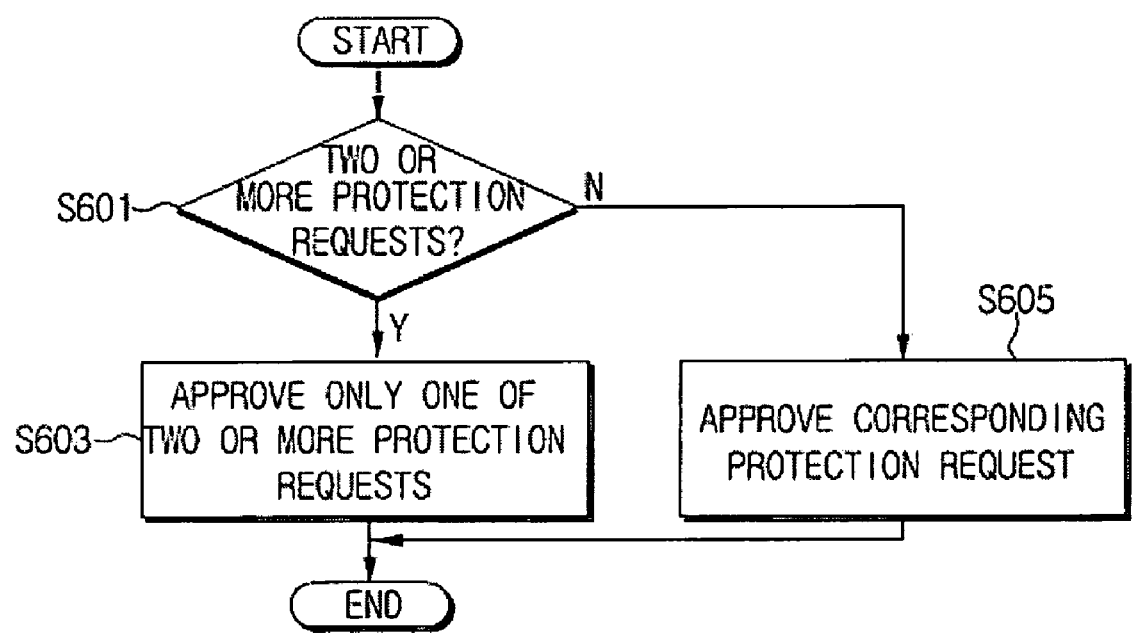
FIG. 6 is a flowchart provided for explaining a method for preventing collision according to the beacon shift performed by a system for dynamically shifting beacons in a distributed wireless network according to an exemplary embodiment of the present invention.

FIG. 6 is a flowchart provided for explaining the method for preventing collision according to the beacon shifting performed by the system for dynamically shifting beacons in a distributed wireless network according to the present invention.

If the neighboring device C receives the protection requests for some slots from two or more devices at step S509 of FIG. 5, the device can protect the corresponding slot only for one of such devices.

The neighboring device may receive two or more protection requests (step S601).

In this case, the neighbor device should select one of the two or more protection requests. In an exemplary embodiment, the neighboring device protects the device having a higher slot index at the slot that the protection-requesting device is presently beaconing at, because to do so is more effective in reducing the length of the dynamic beacon period.

For example, it is assumed that the device C has received the request for protection of the slot index '1' from the device A and the device D as shown as (b) in FIG. 4. In this case, since the device A is presently beaconing at the slot index '5' and the device D is presently beaconing at the slot index '6', the device C will protect the beacon shifting of the device D having the higher slot index.

Further, a device having a lower or higher DEVID may be selected for the protection (step S603).

If the neighboring device has received only one protection request, it would approve the protection request (step S605).

In an exemplary embodiment of the present invention, it is possible for a device that intends to shift the beacons to select and protect at least one free slot.

According to an exemplary embodiment of the present invention, the devices can shift their beacons to free lower slots with the size of the beacon period being reduced. Additionally, any collision that may occur during the shifting of the beacons of the devices can be prevented by detecting such collision and avoiding the shifting of the beacons.

The foregoing embodiments and aspects are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for dynamically shifting beacons in a distributed wireless network, said method comprising:
    selecting a slot among free lower slots which are anterior beacon slots, that are not used during a beacon period of a superframe;
    requesting protection of the selected free lower slot in a beacon group so as to shift a beacon of an external device to the selected free lower slot; and
    at a device, receiving a response to the protection request and shifting the beacons to the selected free lower slot to broadcast the beacons,
    wherein the response is made by neighboring devices in the beacon group that receive the protection request,
    wherein the response is for the protection request for a device having a higher slot index, and
    wherein at least one of the neighboring devices receives the protection request for the selected free lower slot from the device, and receives another protection request from another device, and the protection request and the another protection request are for the same selected free lower slot.

2. The method as claimed in claim 1, wherein the network is a distributed wireless personal area network based on a UWB (Ultra Wide Band) ad-hoc.

3. The method as claimed in claim 1, wherein the selecting the free lower slot comprises:
    receiving beacons of neighboring devices and receiving beacon period occupancy information elements included in the beacons; and
    confirming an occupancy state of the beacon period slots by the neighboring devices by confirming the beacon period occupancy information elements and selecting the free lower slot.

4. The method as claimed in claim 3, wherein at least one of the beacon period occupancy information elements is an occupancy information element of the beacon period provided by at least one of the neighboring devices that broadcasts a beacon, and includes a slot index in which said at least one neighboring device is presently beaconing in the beacon group.

5. The method as claimed in claim 3, wherein the free lower slot selected among the free lower slots is the most anterior free slot in the beacon period.

6. The method as claimed in claim 1, wherein a protection request is made by broadcasting the beacon period occupancy information element, which includes information of the device and an index of the selected free lower slot, to neighboring devices through a beacon.

7. The method as claimed in claim 1, wherein the response includes the beacon period occupancy information element that includes information of the device, a first index of a present beacon slot, and a second index of the selected free lower slot.

8. The method as claimed in claim 1, wherein the response is made through a beacon period occupancy information element that includes information about the device that has made the protection request, a first index of the selected free lower slot, and a second index of the present beacon slot corresponding to the device that has made the protection request.

9. The method as claimed in claim 1, wherein if at least one of the neighboring devices receives a protection request for a same slot as the selected free lower slot from another device, a response is made denying the protection request of one of a device having a highest DEVID and a device having a lowest DEVID among one of a series of DEVIDs of a plurality of devices that have made protection requests and a device having the highest original beacon slot index.

10. The method as claimed in claim 1, wherein the device shifts the beacons to the selected free lower slots only if the response is received from all neighboring devices.

11. A system for dynamically shifting beacons in a distributed wireless network based on a mobile ad-hoc network having at least one device, the system comprising:
    a requesting device which selects a slot among free lower slots which we anterior beacon slots that are not used during a beacon period of a superframe, requests protection of the selected free lower slot in a beacon group so as to shift a beacon of an external device to the selected free lower slot, receives a response from all neighboring devices, and shifts the beacons to the selected free lower slot to broadcast the beacons,
    wherein the response is for the protection request for a device having a higher slot index
    wherein the responding device receives the protection request and another protection request for the same slot as the selected free lower slot from another device, wherein the protection request and the another protection request are for the same selected free lower slot.

12. The system as claimed in claim 11, wherein the network is a UWB (Ultra Wide Band) wireless personal area network.

13. The system as claimed in claim 11, wherein the requesting device selects the free lower slot by receiving the beacons of the responding devices, receiving beacon period occupancy information elements included in the beacons, and providing an occupancy state of the beacon period slots by neighboring devices.

14. The system as claimed in claim 13, wherein at least one of the beacon period occupancy information elements is an occupancy information element of the beacon period provided by at least one of the neighboring devices that broadcasts the beacon, and includes a slot index that the at least one of neighboring devices is presently beaconing in the beacon group.

15. The system as claimed in claim 13, wherein the requesting device, in selecting the free lower slot, selects the most anterior slot among the free lower slots in the beacon period.

16. The system as claimed in claim 11, wherein the protection request is made by the requesting device's broadcasting of the beacon period occupancy information element that includes information related to the requesting device and an index of the selected free lower slot.

17. The system as claimed in claim 11, wherein the response is made through the beacon period occupancy information element that includes information of the requesting device, an index of the selected free lower slot, and an index of the present beacon slot.

18. The system as claimed in claim 11, wherein the response is made through the beacon period occupancy information element that includes information about the device that has sent the protection request to which the response is to be sent, an index of the selected free lower slot, and an index of the present beacon slot corresponding to the device that has made the protection request to which the response is to be sent.

19. The system as claimed in claim 11, wherein if the responding device receives a protection request for the same slot as the selected free lower slot from another device, the response is made denying the protection request of one of the device having a highest DEVID and the device having a lowest DEVID among a series of DEVIDs of the devices that have sent the protection requests.

20. The system as claimed in claim 11, wherein the requesting device shifts the beacons to selected free lower slots only if the responses are received from all the neighboring devices.

* * * * *